United States Patent
Tao (10) Patent No.: US 7,738,433 B2
(45) Date of Patent: Jun. 15, 2010

(54) METHOD, APPARATUS, AND COMPUTER PROGRAM PRODUCTS FOR ADAPTING A TRANSMISSION SETTING

(75) Inventor: Xiao-Jiao Tao, Jarfalla (SE)

(73) Assignee: Sony Ericsson Mobile Communications AB (SE)

( * ) Notice: Subject to any disclaimer, the term of this patent is extended or adjusted under 35 U.S.C. 154(b) by 532 days.

(21) Appl. No.: 11/235,759

(22) Filed: Sep. 27, 2005

(65) Prior Publication Data

US 2007/0070961 A1    Mar. 29, 2007

(51) Int. Cl.
    *H04Q 7/24* (2006.01)
(52) U.S. Cl. .............. 370/338; 370/463; 370/328; 370/390; 370/351; 370/488; 455/445; 455/518; 455/432.2; 455/434; 455/41.2; 709/218
(58) Field of Classification Search ............. 455/434, 455/41.2, 445, 518, 41.1, 432.2, 500, 515; 370/463, 328, 390, 351, 488, 310; 398/128, 398/151, 127, 135; 709/218
    See application file for complete search history.

(56) References Cited

U.S. PATENT DOCUMENTS

| 5,838,472 | A | * | 11/1998 | Welch et al. ............... 398/151 |
| 5,878,221 | A | * | 3/1999 | Szkopek et al. ............. 709/218 |
| 5,903,373 | A | * | 5/1999 | Welch et al. ................ 398/128 |
| 5,903,548 | A | * | 5/1999 | Delamater ................... 370/310 |
| 5,960,344 | A | * | 9/1999 | Mahany ..................... 455/432.2 |
| 6,961,312 | B2 | * | 11/2005 | Kubler et al. ................ 370/238 |
| 7,027,773 | B1 | * | 4/2006 | McMillin .................... 455/41.2 |
| 2002/0136233 | A1 | | 9/2002 | Chen et al. |
| 2003/0228875 | A1 | * | 12/2003 | Alapuranen ................. 455/522 |
| 2006/0133334 | A1 | * | 6/2006 | Ross ........................... 370/338 |

FOREIGN PATENT DOCUMENTS

EP    1 119 137 A1    7/2001

* cited by examiner

*Primary Examiner*—Rafael Pérez-Gutiérrez
*Assistant Examiner*—Joseph Arevalo
(74) *Attorney, Agent, or Firm*—Myers Bigel Sibley & Sajovec, P.A.

(57) ABSTRACT

Method, wireless communication apparatus, and computer program products are provided for adapting at least one transmission setting to be applied by a first transceiver, which is adapted to be operative in a predetermined frequency band, in response to communication by a second transceiver, which is adapted to be operative in the predetermined frequency band. It is determined whether prioritized data traffic is communicated by the second transceiver. If prioritized data traffic is communicated by the second transceiver, the transmission setting is adapted in dependence of the prioritized data traffic.

12 Claims, 4 Drawing Sheets

| PHY rate | DIFS | Data Frame | | | SIFS | ACK | | Total Duration |
|---|---|---|---|---|---|---|---|---|
| | | PHY Over-head | MAC Over-head (34 bytes) | Pay-load (MTU) | | PHY Over-head | MAC Over-head (34 bytes) | |
| 1 Mbps | 50μs | 192μs | 272μs | 12ms | 10μs | 192μs | 112μs | 12.882ms |
| 2 Mbps | | | 136μs | 6ms | | | 56μs | 6.636ms |
| 5.5 Mbps | | | 49μs | 2182μs | | | 20μs | 2.695ms |
| 11 Mbps | | | 25μs | 1091μs | | | 10μs | 1.57ms |

METHOD, APPARATUS, AND COMPUTER PROGRAM PRODUCTS FOR ADAPTING A TRANSMISSION SETTING

FIELD OF THE INVENTION

The present invention relates to methods, apparatus, and computer program products for adapting at least one transmission setting to be applied by a transceiver in a wireless communication apparatus.

BACKGROUND OF THE INVENTION

The Industrial Scientific Medical (ISM) frequency band can be used for wireless communication of data. One communication standard specifying the ISM frequency band for operation is the Bluetooth standard. Another communication standard specifying the ISM frequency band for operation is WLAN (Wireless Local Area Network), e.g. according to IEEE standard 802.11b.

Transceivers adapted according to different communication standards but being operative in a single frequency band may be provided in a single wireless communication apparatus. The wireless communication apparatus may sometimes be relatively small, such as a mobile telephone. If the wireless communication apparatus is relatively small, the transceivers will be located in relatively close proximity. Thus, antennas for the two transceivers will also be located in relatively close proximity. When the transceivers are located in close proximity, they will be sensitive to all incoming signals independent of channel. Thus, the transceivers must process all incoming signals in the frequency band of interest. This could desensitize or block the RF front-ends of the transceivers.

One approaching to avoiding such problems is the Medium Access Control (MAC) sub-layer based Packet Traffic Arbitration (PTA) scheme. PTA implements a control supervisor that acts like a time division traffic controller between WLAN and Bluetooth MACs. The control supervisor controls that each MAC protocol uses a handshake mechanism to authorize transmission before actually sending out information. One problem with the PTA scheme is that it suits asynchronous traffic from both Bluetooth links and WLAN links, but fails to accommodate synchronous or time-critical types of data traffic and applications, e.g. from the Bluetooth transceiver. Synchronous data traffic and time-critical data traffic are generally prioritized data traffic, i.e. the audio data packets should be delivered within a predetermined time period. Prioritized data traffic may e.g. include voice, audio, video or file data.

One situation where problem could occur due to Bluetooth-WLAN coexistence is simultaneous transmission of voice, which is prioritized audio data traffic, over a Bluetooth link and asynchronous TCP (Transmission Control Protocol) traffic, such as emailing and Internet access, over a WLAN link. The prioritized data traffic may be transmitted over a Bluetooth SCO (Synchronous Connection-Oriented) link using HV3 packets. The TCP traffic may be transmitted over a WLAN link as specified e.g. in IEEE 802.11b or 802.11g. Using the SCO link, the Bluetooth transceiver will be active during 1.25 ms (milliseconds). Then, the Bluetooth transceiver will be inactive for 2.5 ms, leaving a window during which the WLAN transceiver may be active before the Bluetooth transceiver is active again.

Figure 1:
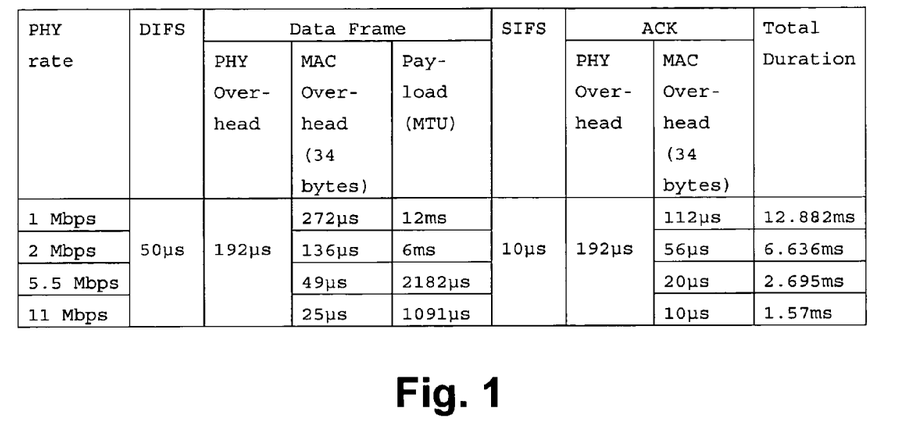
FIG. 1 is a table illustrating parameters affecting the total exchange duration.

Typical frame exchange durations of WLAN 802.11b are listed in the table of FIG. 1. As can be seen from FIG. 1, the total frame exchange duration may under certain conditions exceed the time period during which the Bluetooth transceiver is inactive when an SCO link is used.

This is e.g. the case if the PHY (PHYsical channel) rate is 5.5 Mbps or less, wherein the frame exchange duration may be 2.695 ms or more depending on PHY rate. Thus, the MAC layer frame exchange will not be finalized during the inactive period of the Bluetooth transceiver. As the traffic over the SCO is prioritized, the Bluetooth transceiver will start transmit or receive at the next active period, which may cause the problems mentioned above due to simultaneous transmission by the Bluetooth transceiver and the WLAN transceiver.

Another situation where problem could occur due to Bluetooth-WLAN is transmission of Bluetooth Advance Audio Distribution Profile (A2DP) data traffic and asynchronous WLAN TCP data traffic. The A2DP data traffic is prioritized data traffic and could be communicated using a Bluetooth ACL link and DH5 packets. With an ACL link, the Bluetooth transceiver will be active for 3.75 ms, and inactive for 3.75 ms before it is active again. As can be seen from FIG. 1, this could cause problem when the PHY rate is 2 Mbps or less, wherein the frame exchange rate may be 6.636 ms or more depending on PHY rate.

If a PTA scheme is used, there can be further consequences if the frame exchange duration of the WLAN traffic exceeds the time period, during which the Bluetooth transceiver is inactive. Firstly, the lower PHY rates are normally used for access from longer distances or at the edge of a cell. Thus, any device using the PTA scheme may lose a WLAN link to the access point if prioritized Bluetooth traffic is communicated. Secondly, for any reason when the WLAN transceiver cannot get its MAC ACK (ACKnowledge message) back after a few retries, its auto-rate-fallback mechanism will switch the transmission rate to a lower one. This will obviously worsen the situation. The transmission rate will thus be further reduced until the lowest basic transmission rate is reached. Finally, the device containing the Bluetooth transceiver and the WLAN transceiver will be disconnected. Consequently, the PTA scheme will not solve the co-existence problem between prioritized BT traffic and asynchronous WLAN traffic. In such a case, only the Bluetooth communication is guaranteed.

A further solution to some of these problems may be provided by a MAC layer approach. However, a MAC layer approach would require that certain modifications be made to access points that are already deployed, such as in hotspots.

SUMMARY OF THE INVENTION

Some embodiments of the present invention may increase the flexibility of a wireless communication apparatus having a first and a second transceiver for communicating over a single frequency band.

According to one embodiments of the present invention, a method for adapting at least one transmission setting to be applied by a first transceiver, which is adapted to be operative in a predetermined frequency band, in response to communication by a second transceiver, which is adapted to be operative in the predetermined frequency band, comprises determining whether prioritized data traffic is communicated by the second transceiver. If prioritized data traffic is communicated by the second transceiver, the transmission setting is adapted in response to the prioritized data traffic.

If prioritized data traffic is communicated by the second transceiver, at least one transmission parameter for the prioritized data traffic may be determined. Then, the step of adapting may comprise adapting the transmission setting in response to the determined transmission parameter.

If it is determined that prioritized data traffic is communicated, the duty cycle of the prioritized data traffic may be determined. The duty cycle may be a transmission parameter for the prioritized data traffic. The step of adapting may comprise adapting the transmission setting in response to the determined duty cycle.

Adapting the transmission setting may comprise adapting a maximum allowable size of a data payload of a data frame to be transmitted by the first transceiver.

The step of adapting may comprise communicating any adapted transmission setting in a negotiation process for setting up a transport connection.

The step of adapting may comprise sending a message from the first transceiver to an endpoint, to which the first transceiver is connected, with information of any adapted transmission setting.

The step of adapting may comprise disconnecting a connection between the first transceiver and an endpoint, to which the first transceiver is connected, in response to initiation of prioritized data traffic or alteration of type of prioritized data traffic by the second transceiver. Also a connection between the first transceiver and the endpoint may be established using any adapted transmission setting.

According to a second embodiment, a wireless communication apparatus comprises a first transceiver, which is adapted to be operative in a predetermined frequency band, having a processor, and a second transceiver, which is adapted to be operative in the predetermined frequency band. The processor is adapted to determine whether prioritized data traffic is communicated by the second transceiver, and to adapt, when prioritized data traffic is communicated by the second transceiver, at least one transmission setting to be applied by the first transceiver in response to the prioritized data traffic.

The processor may be adapted to determine, when prioritized data traffic is communicated by the second transceiver, at least one transmission parameter for the prioritized data traffic, and to adapt the transmission setting in response to the determined transmission parameter.

The processor may be adapted to determine, when prioritized data traffic is communicated by the second transceiver, the duty cycle of the prioritized data traffic, which may be a transmission parameter for the prioritized data traffic, and to adapt the transmission setting in response to the determined duty cycle.

The processor may be adapted to adapt the transmission setting by adapting a maximum allowable size of a data payload of a data frame to be transmitted by the first transceiver.

The wireless communication apparatus may be a portable or handheld mobile radio communication equipment, a mobile radio terminal, a mobile telephone, a pager, a communicator, an electronic organizer, or a smartphone.

According to a third embodiment, a computer program product comprises computer program code means for executing the method for adapting at least one transmission setting, when said computer program code means are run by an electronic device having computer capabilities.

According to a fourth embodiment, a computer readable medium having stored thereon a computer program product comprising computer program code means for executing the method for adapting at least one transmission setting, when said computer program code means are run by an electronic device having computer capabilities.

Further embodiments of the invention are defined in the dependent claims.

Some embodiments of the present invention may allow one or several transmission settings that are to be applied by the first transceiver to be adapted. Thus, it may be ascertained that the exchange duration of the first transceiver does not exceed the time period, during which the second transceiver will be inactive. Consequently, the first and the second transceiver may operate intermittently when prioritized data traffic is communicated, whereby the flexibility of the communication apparatus is increased.

In some embodiments of the present invention, a computer program product is configured to adapt at least one transmission setting to be applied by a first transceiver, which is adapted to be operative in a predetermined frequency band, in response to communication by a second transceiver, which is adapted to be operative in the predetermined frequency band. The computer program product includes a computer readable storage medium having computer readable program code embodied therein. The computer readable program code includes computer readable program code that is configured to determine whether prioritized data traffic is communicated by the second transceiver, and computer readable program code that is configured to adapt, if prioritized data traffic is communicated by the second transceiver, the transmission setting in response to the prioritized data traffic.

In some further embodiments, the computer readable program code is configured to determine, if prioritized data traffic is communicated by the second transceiver, at least one transmission parameter for the prioritized data traffic. The computer readable program code that is configured to adapt the transmission setting carries out the adapting of the transmission setting in response to the determined transmission parameter.

In some further embodiments, the computer readable program code is configured to determine, if it is determined that prioritized data traffic is communicated, the duty cycle of the prioritized data traffic, which is a transmission parameter for the prioritized data traffic. The computer readable program code that is configured to adapt the transmission setting carries out the adapting of the transmission setting in response to the determined duty cycle.

In some further embodiments, the computer readable program code that is configured to adapt the transmission setting includes computer readable code that is configured to adapt a maximum allowable size of a data payload of a data frame to be transmitted by the first transceiver.

In some further embodiments, the computer readable program code that is configured to adapt the transmission setting includes computer readable code that is configured to communicate any adapted transmission setting in a negotiation process for setting up a transport connection.

In some further embodiments, the computer readable program code that is configured to adapt the transmission setting includes computer readable code that is configured to send a message from the first transceiver to an endpoint, to which the first transceiver is connected, with information of any adapted transmission setting.

DETAILED DESCRIPTION OF EMBODIMENTS OF THE INVENTION

The present invention now will be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art.

It will be understood that, although the terms first, second, etc. may be used herein to describe various elements, these elements should not be limited by these terms. These terms are only used to distinguish one element from another element. Thus, a first element discussed below could be termed a second element without departing from the scope of the present invention. In addition, as used herein, the singular forms "a", "an" and "the" are intended to include the plural forms as well, unless the context clearly indicates otherwise. It also will be understood that, as used herein, the term "comprising" or "comprises" is open-ended, and includes one or more stated elements, steps and/or functions without precluding one or more unstated elements, steps and/or functions. The term "and/or" includes any and all combinations of one or more of the associated listed items. The common abbreviation "e.g.", which derives from the Latin phrase "exempli gratia," may be used to introduce or specify a general example or examples of a previously mentioned item, and is not intended to be limiting of such item.

It will also be understood that when an element is referred to as being "connected" to another element, it can be directly connected to the other element or intervening elements may be present. In contrast, when an element is referred to as being "directly connected" to another element, there are no intervening elements present. It will also be understood that the sizes and relative orientations of the illustrated elements are not shown to scale, and in some instances they have been exaggerated for purposes of explanation. Like numbers refer to like elements throughout.

Embodiments according to the present invention are described with reference to block diagrams and/or operational illustrations of methods, wireless communication terminals, and computer program products. It is to be understood that each block of the block diagrams and/or operational illustrations, and combinations of blocks in the block diagrams and/or operational illustrations, can be implemented by radio frequency, analog and/or digital hardware, and/or computer program instructions. Computer program instructions may be provided to a processor circuit of a general purpose computer, special purpose computer, ASIC, and/or other programmable data processing apparatus, such that the instructions, which execute via the processor of the computer and/or other programmable data processing apparatus, create means for implementing the functions/acts specified in the block diagrams and/or operational block or blocks. In some alternate implementations, the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

Figure 2:
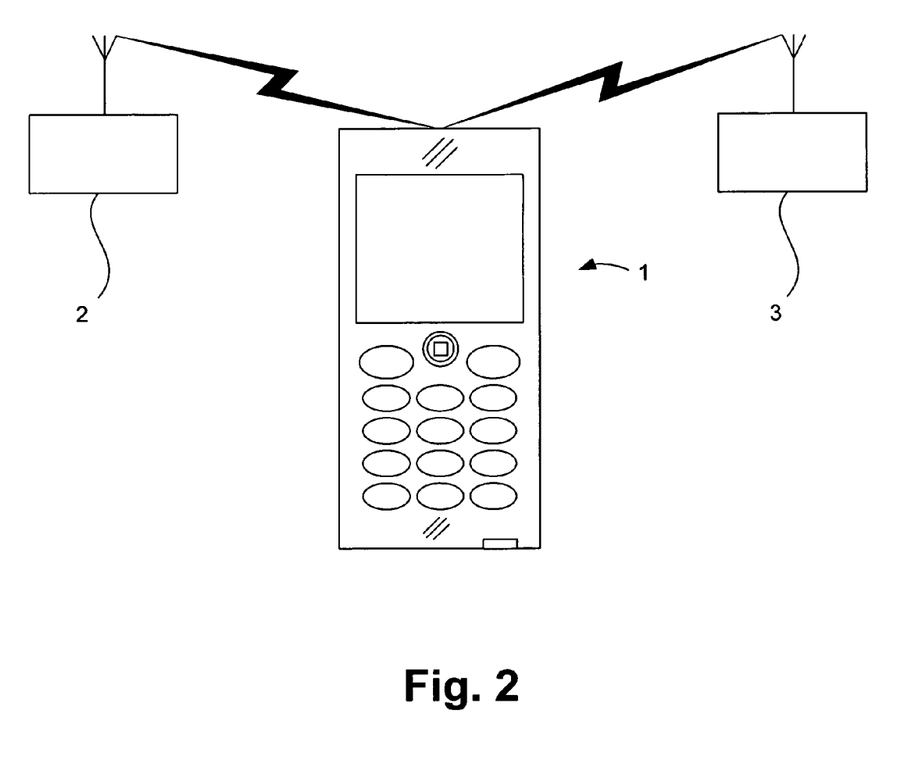
FIG. 2a is a schematic view of a wireless communication apparatus wirelessly connected to a first and a second external device according to some embodiments of the present invention.

FIG. 2 illustrates a wireless communication apparatus 1. The wireless communication apparatus is adapted to wirelessly communicate with a first external communication device 2 according to a first communication standard. Also, the wireless communication apparatus 1 is adapted to wirelessly communicate with a second external device 3 according to a second communication standard. The first and the second communication standard may specify operation in a common frequency band, such as the ISM frequency band around 2.4 GHz. The first communication standard may e.g. be a WLAN standard, such as any IEEE 802.11 standard, e.g. 802.11b and 802.11g. The second communication standard may e.g. any available Bluetooth standard, such as Bluetooth 1.0. Both Bluetooth and WLAN may be used for wireless short-range communication.

Figure 3:
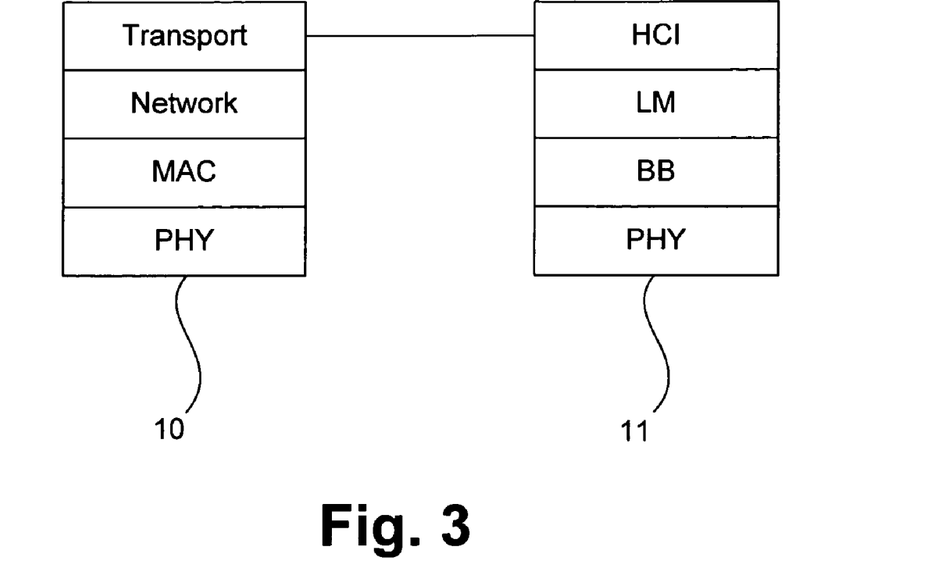
FIG. 3 is a block diagram of protocol stacks according to some embodiments of the present invention.

The wireless communication apparatus 1 comprises a first and a second transceiver 20, 30 (FIG. 3). The first transceiver 20 may adapted for communication according to the first communication standard. Thus, the first transceiver 20 may be a WLAN transceiver. The second transceiver 30 may be adapted for communication according to the second communication standard. Thus, the second transceiver 30 may be a Bluetooth transceiver.

Synchronous and/or time-critical data traffic, also referred to as prioritized data traffic, may be transmitted by the second transceiver 30. Asynchronous and/or synchronous data traffic may be transmitted by the first transceiver 20. An frame exchange duration for communicating data traffic according to the first communication standard may, without any proactive action, exceed a time period, during which the second transceiver 30 is inactive according to the second communication standard, e.g. as described in the description of the related art. When the second transceiver 30 is active, it may both transmit and receive data. During the frame exchange duration, the first transceiver 20 may transmit data as well as receive an ACK in response thereto.

When asynchronous data traffic or a data frame is to be communicated by the first transceiver 20, it is determined whether prioritized data traffic is communicated by the second transceiver 30. If prioritized data traffic is communicated by the second transceiver 20, at least one transmission setting to be applied by the first transceiver 20 is adapted. The transmission setting(s) may be adapted such that the frame exchange duration will not exceed the inactive time period of the second transceiver 30.

By adapting the transmission setting(s), it is ascertained that communication according to the first communication standard will not be interrupted by communication according to the second communication standard. Thus, the link will not be lost for the first transceiver 20 due to overlapping communication by the second transceiver 30. Furthermore, any auto-rate fallback mechanism applied by the first transceiver 20 will not occur due to the interruption by the overlapping communication. Consequently, prioritized traffic data may be communicated by the second transceiver 30 intermittently with data traffic by the first transceiver 20. Thus, the flexibility of the wireless communication apparatus 1 is improved compared to if intermittent transmission may not occur without risking losing the link. Also, RF front-ends of the transceivers will not be desensitized or blocked.

In one embodiment, the second transceiver 30 is only adapted to transmit prioritized data traffic according to a single transmission scheme. Then, the duty cycle of the prioritized data traffic may be known by the first transceiver 20. Consequently, the transmission setting(s) for the first transceiver 20 may be adapted in response to an announcement that prioritized traffic data is or is to be communicated. Then, the transmission setting(s) to apply may be retrieved from a memory in response to the announcement. Different settings may be necessary, e.g. in dependence of (responsive to) the PHY rate available.

In another embodiment, the second transceiver 30 is adapted to transmit different types of prioritized traffic data. The different types of traffic data may e.g. be communicated over different traffic channel types. Then, the transmission setting(s) for the first transceiver 20 may be adapted in dependence of the prioritized traffic data, e.g. in dependence of at least one transmission parameter for the prioritized traffic data.

An example of prioritized data traffic from the second transceiver 30 is voice transmitted over a Bluetooth SCO link using HV3 packets. Another example of prioritized data traffic is Bluetooth A2DP data traffic transmitted over a Bluetooth ACL link using DH5 packets. Prioritized data traffic may be data traffic that should be delivered within a predetermined time period, e.g. a predetermined time period after it has been generated. The time period may be specified by the communication standard used. Prioritized data may e.g. include voice, audio, video or file data.

Transmission parameters for the prioritized data traffic according to the second communication standard may e.g. be the duty cycle of the prioritized data traffic, and/or packet type used to transmit the prioritized data traffic in combination with the Bluetooth profile being used. By knowing at least one of the transmission parameters, the inactive time period according to the second communication system may be determined. The transmission setting(s) for the first transceiver 20 may be adapted accordingly. For example, if it is determined that prioritized data traffic is communicated by the second transceiver 30, the duty cycle of the prioritized data traffic may be determined by the first transceiver 20. The duty cycle may be determined from any received transmission parameter, such as packet types in combination with Bluetooth profiles information. Then, the transmission setting(s) for the first transceiver 20 may be adapted in dependence of the determined duty cycle. If it is known that an HV3 packet is used, it may be determined that the frame exchange duration should be maximally 2.5 ms. Thus, the transmission setting(s) may be adapted accordingly. If it is known that an A2DP profile with DH5 packet is used, it may be determined that the frame exchange duration should be maximally 3.75 ms. Thus, the transmission setting(s) may be adapted accordingly.

One transmission setting that may be adapted is the maximum allowable size of a data payload of a MAC data frame. The data payload may also be referred to as a TCP maximum transmission unit (MTU). The maximum allowable size of the data payload may be adapted by changing the maximum number of bytes of the data payload. For example, if a Bluetooth SCO link with HV3 packet type is used, the data payload may be adapted to 150 bytes. Then, the frame exchange duration will not exceed 2.5 ms. Similarly, if a Bluetooth A2DP profile link with DH5 packet type is used, the data payload may be adapted to 275 bytes. Then, the frame exchange duration will not exceed 3.75 ms. If no prioritized data traffic is communicated by the second transceiver 30, the data payload may be adapted to 1500 bytes.

FIG. 3 illustrates portions of a first and a second protocol stack 10, 11. The first protocol stack 10 illustrates one embodiment of lower protocols of a protocol stack for WLAN. The second protocol stack 11 illustrates one embodiment of lower protocols of a protocol stack for Bluetooth. The first protocol 10 may comprise a physical layer (PHY), a MAC layer, a network layer, and a transport layer protocol. The second protocol stack may comprise a physical layer, a base band (BB) layer (or MAC layer), a link manager (LM) layer, and a host controller interface (HCI) layer protocol.

Figure 4:
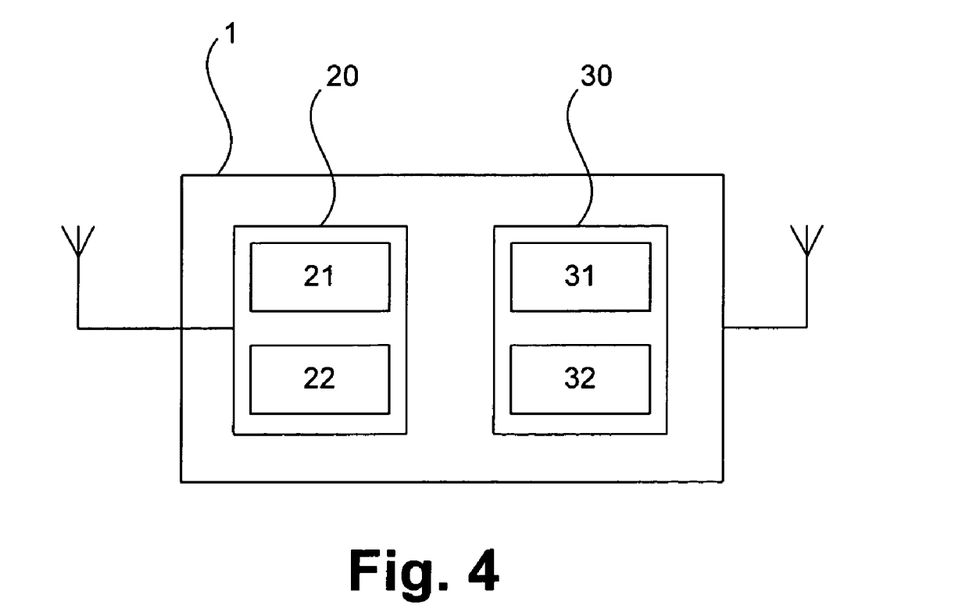
FIG. 4 is a block diagram of components of the wireless communication apparatus of FIG. 1 according to some embodiments of the present invention.

FIG. 4 illustrates components of the wireless communication apparatus 1. The wireless communication apparatus 1 comprises the first transceiver 20. The first transceiver 20 may comprise one or several processors, jointly illustrated by a first processor 21. The first transceiver 20 may also comprise one or several memories, jointly illustrated by memory 22. Memory 22 may comprise software needed by transceiver 20, such as by processor 21, for any software implemented protocol layer. Also, the wireless communication apparatus 1 comprises the second transceiver 30. The second transceiver 30 may comprise one or several processors, jointly illustrated by a second processor 31. The second transceiver 30 may also comprise one or several memories, jointly illustrated by memory 32. Memory 32 may comprise software needed by transceiver 30, such as by processor 31, for any software implemented protocol layer.

The transport layer protocol of the first protocol stack 10 may be TCP (Transmission Control Protocol). The first processor 21 may be adapted to implement the transmission layer protocol. Furthermore, the first processor 21 may be adapted to adapt the transmission setting(s).

Any transmission parameter for the prioritized data traffic may be provided from the HCI layer protocol. The second processor 31 may be adapted to implement the HCI layer protocol. The second processor 31 may also be adapted to provide any transmission parameter(s) for the prioritized traffic data. The transmission parameter(s) may be communicated between layers of the first and second protocol stacks 10, 11. Thus, the first transceiver 20 and the second transceiver 30 are operatively connected. For example the HCI layer protocol may be operatively connected to the TCP layer protocol. The HCI layer protocol may be directly connected to the TCP layer protocol. It is may be advantageous to implement some embodiments of the invention in layers above the MAC/BB layer protocols, e.g. as modifications in MAC/BE layer protocols of devices already existing one the marked is not necessary.

The maximum allowable size of the data payload may be communicated between the first transceiver 20 and an endpoint, to which the first transceiver 20 is operatively connected. The first transceiver 20 and a transceiver of the first external device 2 may be endpoints for data traffic. The maximum size of the data payload may e.g. be communicated in a negotiation process for setting up a transport connection between the endpoints. The connection may e.g. be a TCP connection.

The adaptation of the transmission setting(s) may e.g. be made in response to initiation of transmission of prioritized data. For example, the first transceiver 20 may e.g. be in operation when the second transceiver 30 initiates communication of prioritized data traffic. The second transceiver 30 may announce that communication of prioritized data traffic is to commence. If necessary, any transmission parameter for the prioritized data traffic may be announced. Then, the first transceiver 20, e.g. the first processor 21, may adapt the transmission setting(s) in response to said announcement. Alternatively or additionally, the adaptation may be made in response to alteration of prioritized data traffic type of prioritized data traffic to be transmitted by the second transceiver 30. Prioritized data traffic may be altered from a first prioritized data traffic type to a second prioritized data traffic type. The first prioritized data traffic type may e.g. be voice transmitted over an SCO link. The second prioritized data traffic type may e.g. be A2DP data traffic over an ACL link. When the prioritized data traffic type is altered, the alteration may be announced by the second transceiver 30, e.g. by the second processor 31. Furthermore, any transmission parameter(s) needed for adapting the transmission setting(s) may be announced by the second transceiver 30. Then, the transmission setting(s) may be adapted by the second transceiver, e.g. by the first processor 21, in response to said announcement.

In one embodiment, prioritized data traffic may be initiated or altered during ongoing communication by the first transceiver 20. Then, the process for adapting the transmission setting(s) may comprise sending a message between the endpoints, between which the communication is ongoing. The message may comprise information of any adapted transmission setting. The message may be communicated when transactions are carried out between said endpoints. The transactions may e.g. be TCP transactions. The message may e.g. be an error message. The error message may e.g. be an Internet Control Management (ICMP) error message with new MTU size information. The message may e.g. be communicated according to the Internet standard RFC1191.

In an embodiment, an ongoing session according to the first communication standard is disconnected in response to initiation or alteration of prioritized data traffic by the second transceiver 30. Then, adapted transmission setting(s) may be determined as described above. Once the transmission setting(s) has been adapted, a new session according to the first communication standard may be established using the adapted transmission setting(s).

The transmission setting(s) may be adapted taking into account time-required for any transmission parameter according to the first communication standard. Transmission parameters according to the first communication standard may e.g. be PHY rate, DIPS (DCF (Distributed Coordination Function) InterFrame Space), PHY overhead, MAC overhead, payload, SIFS (Short InterFrame Space). Also, any guard period needed and/or RTS (Request-To-Send)/CTS (Clear-To-Send) or CTS-to-self signals being used may also be taken into account.

Figure 5:
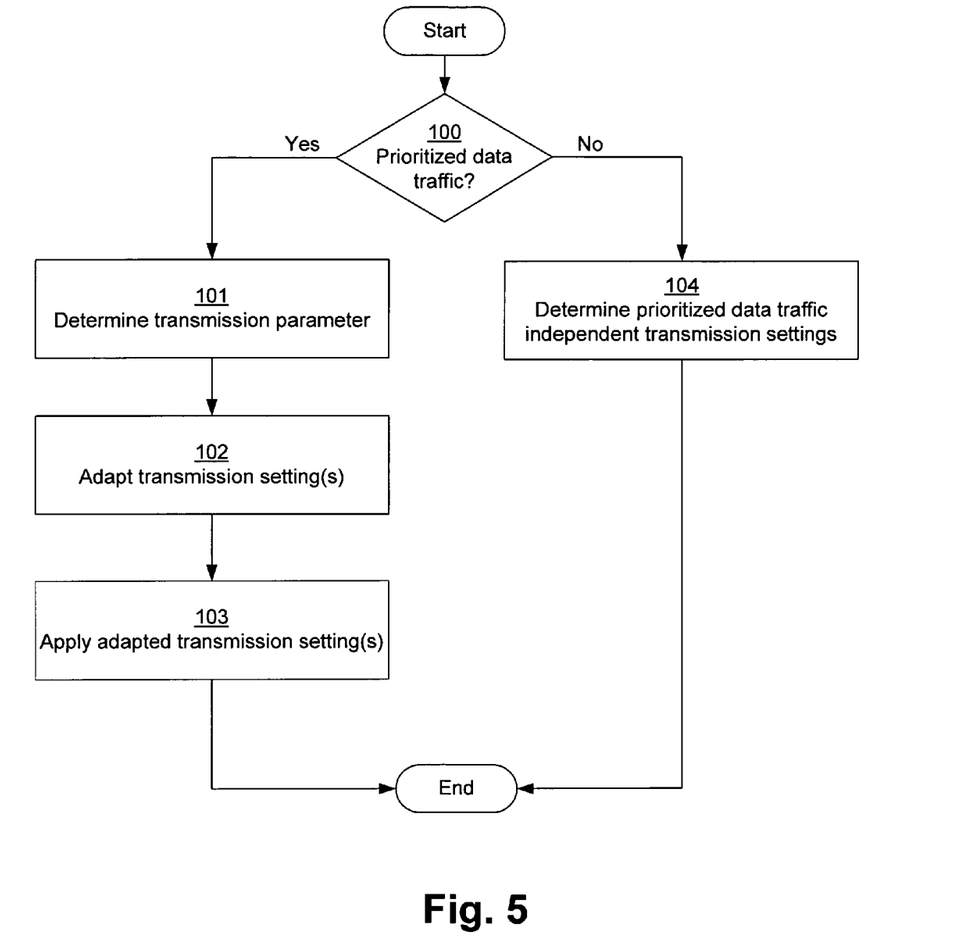
FIG. 5 is a flow-chart of a method for adapting at least one transmission setting according to some embodiments of the present invention.

FIG. 5 illustrates an embodiment of a method for adapting at least one transmission setting to be applied by the first transceiver 20. In a first step 100, it is determined whether prioritized data traffic is communicated by the second transceiver 30. The determination may be made by the first transceiver 20, e.g. before a frame exchange is to commence. It may e.g. be determined whether the second transceiver 30 has announced that it is about to communicate prioritized data traffic. If the answer in step 100 is yes, the procedure proceeds to step 101. In step 101, at least one parameter of the prioritized data traffic is determined. Any parameter needed for adapting the transmission setting(s) may be determined. The transmission parameter(s) may e.g. be determined from a message or information issued by the second transceiver 30. Alternatively, e.g. if only one type of prioritized data traffic may be transmitted, the transmission setting(s) may be stored in memory 22 and may be retrieved in response to an announcement from the second transceiver 30. The announcement may e.g. be a trigger signal. When the transmission parameter(s) has/have been determined, the procedure proceeds to step 102. In step 102, the transmission setting(s) is adapted. The transmission setting(s) is adapted in dependence of the prioritized data traffic, e.g. as described above. In step 103, the adapted transmission setting(s) is applied by the first transceiver 20. The adapted transmission setting(s) may also be applied by communicating any of them to an endpoint, to which the first transceiver 20 is operatively connected. Still additionally or alternatively, the adapted transmission setting(s) may be applied by disconnecting an established connection between the first transceiver 20 and an endpoint. Then a new connection may be established between the first transceiver and said endpoint using the adapted transmission setting(s). When the adapted transmission setting(s) has been applied, the procedure is ended. If the answer in step 101 is no, the procedure proceeds to step 104. In step 104, the transmission setting(s) to apply is determined independently of any prioritized data traffic. For example, any previously applied transmission setting(s) may be applied. For example settings for maximally allowable data payload may be set. After step 104, the procedure is ended.

Not all steps illustrated in FIG. 4 are necessary for carrying out the method according to the invention. For example, step 101, 103 and 104 are not necessary in all embodiments, as the adaptation of the transmission setting(s) may be applied without carrying out these steps.

For purposes of illustration only, some embodiments of the present invention have been described with reference to a few types of communication protocols. However, some embodiments of the invention are also applicable for co-location of other types of communication standards. The first communication standard may e.g. be IEEE 802.11g. The second communication standard may e.g. be Bluetooth 2.0. Furthermore, some embodiments of the invention may also be implemented in other frequency bands than the ISM frequency band. Also, some embodiments of the invention may be carried out according to communication protocols other than Bluetooth and WLAN.

In some embodiments of the present invention, traffic data may be communicated by the first transceiver 20 intermittently with communication of prioritized data traffic by the second transceiver 20. Some embodiments of the invention may be used alone or in combination with a MAC-layer based PTA scheme, as it resides in the protocol layers above the MAC layers. Furthermore, some embodiments of the invention may provide robust link quality. Also, as transmission according to both communication standards may be performed intermittently, the throughput will improved compared to disconnection of a link according to the first communication standard in case of problem with co-existence. Some embodiments of the invention may be implemented without any modifications in devices existing on the market.

Some embodiments may be carried out through a computer program product, which enables implementation of the method and functions described herein. Some embodiments may be carried out when the computer program product is loaded and run in a system having computer capabilities, such as processor 21. Computer program, software program, program product, or software, in the present context mean any expression, in any programming language, code or notation, of a set of instructions intended to cause a system having a processing capability to perform a particular function directly or after conversion to another language, code or notation.

The present invention has been described above with reference to specific embodiments. However, other embodiments than the above described are equally possible within the scope of the invention. Different method steps than those described above, performing the method by hardware or software, may be provided within the scope of the invention. The different features and steps of the invention may be combined in other combinations than those described. The scope of the invention is only limited by the appended patent claims.

What is claimed is:

1. A method for adapting at least one transmission setting to be applied by a first transceiver for communications in a predetermined frequency band in response to communication by a second transceiver that communicates in the predetermined frequency band, the method comprising:

determining whether prioritized data traffic is to be communicated by the second transceiver; and in response to determining that prioritized data traffic is to be communicated by the second transceiver, adapting the transmission setting applied to the first transceiver in response to a duty cycle of the prioritized data traffic;

wherein adapting the transmission setting applied to the first transceiver further comprises adapting a maximum allowable size of a data payload of a data frame to be transmitted by the first transceiver in response to determining that prioritized data traffic is to be communicated by the second transceiver, and wherein adapting a maximum allowable size of data payload of a data frame to be transmitted by the first transceiver comprises adapting the maximum allowable size so that a frame exchange duration of the first transceiver does not exceed an inactive time period of the second transceiver.

2. The method according to claim 1, wherein adapting the transmission setting applied to the first transceiver further comprises communicating the adapted transmission setting in a negotiation process for setting up a transport connection by the first transceiver.

3. The method according to claim 1, wherein adapting the transmission setting applied to the first transceiver further comprises sending a message from the first transceiver to an endpoint, to which the first transceiver is communicatively connected via a wireless interface, with information that identifies the adapted transmission setting.

4. The method according to claim 1, wherein adapting the transmission setting applied to the first transceiver further comprises disconnecting a connection between the first transceiver and an endpoint, to which the first transceiver is communicatively connected via a wireless interface, in response to initiation of prioritized data traffic or alteration of type of prioritized data traffic by the second transceiver, and establishing a new communication connection via the wireless interface between the first transceiver and the endpoint using the adapted transmission setting.

5. The method according to claim 1, wherein adapting the transmission setting applied to the first transceiver comprises adapting the transmission setting so that a frame exchange duration of the first transceiver does not exceed an inactive time period of the second transceiver.

6. A wireless communication apparatus, comprising:

a first transceiver that is configured to communicate in a predetermined frequency band and that comprises a processor; and a second transceiver that is configured to communicate in the predetermined frequency band, wherein the processor of the first transceiver is configured to determine whether prioritized data traffic is to be communicated by the second transceiver and, in response to determining that prioritized data traffic is to be communicated by the second transceiver, to adapt at least one transmission setting to be applied by the first transceiver for communications in response to a duty cycle of the prioritized data traffic; and wherein the processor of the first transceiver is further configured to adapt the transmission setting to be applied to the first transceiver by adapting a maximum allowable size of a data payload of a data frame to be transmitted by the first transceiver so that a frame exchange duration of the first transceiver does not exceed an inactive time period of the second transceiver.

7. The wireless communication apparatus according to claim 6, wherein the processor is further configured to adapt the transmission setting applied to the first transceiver by adapting a maximum allowable size of a data payload of a data frame to be transmitted by the first transceiver in response to determining that prioritized data traffic is to be communicated by the second transceiver.

8. The wireless communication apparatus according to claim 6, wherein the wireless communication apparatus comprises a portable or handheld mobile radio communication equipment, a mobile radio terminal, a mobile telephone, a pager, a communicator, an electronic organizer, and/or a smartphone.

9. A computer program product configured to adapt at least one transmission setting to be applied by a first transceiver for communications in a predetermined frequency band in response to communication by a second transceiver in the predetermined frequency band, the computer program product comprising:

a computer readable storage medium having computer readable program code embodied therein, the computer readable program code comprising:

computer readable program code that is configured to determine whether prioritized data traffic is to be communicated by the second transceiver; and computer readable program code that is configured to adapt, in response to the determination that prioritized data traffic is to be communicated by the second transceiver, the transmission setting applied to the first transceiver in response to a duty cycle of the prioritized data traffic, wherein adaptation of the transmission setting applied to the first transceiver comprises adapting maximum allowable size of a data payload of a data frame to be transmitted by the first transceiver so that a frame exchange duration of the first transceiver does not exceed an inactive time period of the second transceiver.

10. The computer program product of claim 9, wherein the computer readable program code that is configured to adapt the transmission setting comprises computer readable code that is configured to adapt a maximum allowable size of a data payload of a data frame to be transmitted by the first transceiver in response to the determination that prioritized data traffic is to be communicated by the second transceiver.

11. The computer program product of claim 9, wherein the computer readable program code that is configured to adapt the transmission setting comprises computer readable code that is configured to communicate the adapted transmission setting in a negotiation process for setting up a transport connection by the first transceiver.

12. The computer program product of claim 9, wherein the computer readable program code that is configured to adapt the transmission setting comprises computer readable code that is configured to send a message from the first transceiver to an endpoint, to which the first transceiver is communicatively connected via a wireless interface, with information that identifies the adapted transmission setting.

* * * * *

UNITED STATES PATENT AND TRADEMARK OFFICE
CERTIFICATE OF CORRECTION

| | | |
|---|---|---|
| PATENT NO. | : 7,738,433 B2 | Page 1 of 1 |
| APPLICATION NO. | : 11/235759 | |
| DATED | : June 15, 2010 | |
| INVENTOR(S) | : Tao | |

It is certified that error appears in the above-identified patent and that said Letters Patent is hereby corrected as shown below:

On Title Page:
(54): Please correct "METHOD" to read -- METHODS --

In The Specification:
Column 1, Line 1: Please correct "METHOD" to read -- METHODS --

Signed and Sealed this
Fourth Day of January, 2011

David J. Kappos
*Director of the United States Patent and Trademark Office*